(12) United States Patent
McDuff

(10) Patent No.: US 9,408,431 B2
(45) Date of Patent: Aug. 9, 2016

(54) DUAL-FINISH LAMINATED PANEL

(75) Inventor: Rodrigue McDuff, St-Bruno (CA)

(73) Assignee: GESTION MCD INC., Saint-Bruno-de-Montarville (CA)

( * ) Notice: Subject to any disclaimer, the term of this patent is extended or adjusted under 35 U.S.C. 154(b) by 558 days.

(21) Appl. No.: 13/156,490

(22) Filed: Jun. 9, 2011

(65) Prior Publication Data

US 2011/0302807 A1 Dec. 15, 2011

Related U.S. Application Data

(60) Provisional application No. 61/352,992, filed on Jun. 9, 2010.

(51) Int. Cl.
*A43B 23/02* (2006.01)
*A43B 1/00* (2006.01)
(Continued)

(52) U.S. Cl.
CPC ............. *A43B 1/0072* (2013.01); *A43B 5/1666* (2013.01); *A43B 23/026* (2013.01); *A43B 23/0235* (2013.01); *B29D 35/146* (2013.01); *B32B 3/08* (2013.01); *B32B 3/16* (2013.01); *B32B 5/245* (2013.01); *B32B 7/12* (2013.01); *B32B 38/06* (2013.01); *B29C 65/4815* (2013.01); *B29C 65/5057* (2013.01); *B29C 66/433* (2013.01); *B29C 66/472* (2013.01); *B29L 2031/501* (2013.01); *B29L 2031/737* (2013.01);
(Continued)

(58) Field of Classification Search
CPC ............... B32B 3/10; B32B 3/14–3/18; B32B 2250/00–2250/03; B32B 3/08; B32B 5/245; B32B 7/12; B32B 38/06; B32B 2437/02; B32B 37/12; B32B 2262/0276; B32B 2266/025; B29D 35/146; A43B 1/0072; A43B 23/0235; A43B 23/026; A43B 5/1666; B29C 65/5057; B29C 66/433; B29C 66/472; B29L 2031/501; B29L 2031/737
USPC ............. 36/47, 34; 428/77, 131; 12/146, 147; 156/297
See application file for complete search history.

(56) References Cited

U.S. PATENT DOCUMENTS 4,813,158 A * 3/1989 Brown ............................ 36/114
5,783,133 A * 7/1998 Hara et al. ..................... 264/261
(Continued)

OTHER PUBLICATIONS

Kogel, et al. Industrial Minerals and Rocks—Commodities, Markets, and Uses. (2006). Society for Mining, Metallurgy, and Exploration (SME). 7th Edition. pp. 1376-1377. Online version available at: http://app.knovel.com/hotlink/toc/id:kpIMRCMUE1/industrial-minerals-rocks.*

*Primary Examiner* — Maria Veronica Ewald
*Assistant Examiner* — Brian Handville
(74) *Attorney, Agent, or Firm* — Norton Rose Fulbright Canada LLP

(57) ABSTRACT

A laminated panel comprises a core layer and two fusible layer portions. The core layer has an upper surface. The fusible layers each have an upper surface with a surface finish and a lower surface. The lower surface of the first fusible layer portion is secured to the upper surface of the core layer, exposing the first surface finish. The lower surface of the second fusible layer portion is secured to at least one of the upper surface of the core layer and the upper surface of the first fusible layer portion, exposing the second surface finish. The two fusible layer portions are positioned side by side and are fused to be coplanar. A method for laminating panels is also provided.

12 Claims, 5 Drawing Sheets

(51) Int. Cl.

| | | |
|---|---|---|
| *A43B 5/16* | (2006.01) | |
| *B29D 35/14* | (2010.01) | |
| *B32B 3/08* | (2006.01) | |
| *B32B 3/16* | (2006.01) | |
| *B32B 5/24* | (2006.01) | |
| *B32B 7/12* | (2006.01) | |
| *B32B 38/06* | (2006.01) | |
| *B29C 65/50* | (2006.01) | |
| *B29C 65/00* | (2006.01) | |
| *B29L 31/50* | (2006.01) | |
| *B29L 31/00* | (2006.01) | |
| *B32B 37/12* | (2006.01) | |
| *B29C 65/48* | (2006.01) | |

(52) U.S. Cl.
CPC ............. *B32B 37/12* (2013.01); *B32B 2250/03* (2013.01); *B32B 2262/0276* (2013.01); *B32B 2266/025* (2013.01); *B32B 2437/02* (2013.01); *Y10T 156/1089* (2015.01)

(56) References Cited

U.S. PATENT DOCUMENTS

2003/0035917 A1\* 2/2003 Hyman ............................ 428/67
2008/0020187 A1\* 1/2008 McDuff et al. ................ 428/172

\* cited by examiner

DUAL-FINISH LAMINATED PANEL

CROSS-REFERENCE TO RELATED APPLICATION

The present patent application claims priority on U.S. provisional Patent Application No. 61/352,992, filed on Jun. 9, 2010, and incorporated herein by reference.

BACKGROUND OF THE INVENTION

1. Field of the Invention

The present invention generally relates to laminated panels and to a lamination process and, more particularly but not exclusively, to a process for laminating various layers into a laminated panel with dual finishes, for subsequent use of the laminated panel as a component of a boot quarter, and of other sporting goods or the like.

2. Background Art

Laminated panels are found in a plurality of products. Laminated panels typically consist of a plurality of layers, each layer being part of the laminated panels for given properties. Therefore, laminated panels are used as an alternative to well known materials, such as leather and polymers (e.g., vinyl), in the fabrication of goods.

The layers constituting laminated panels are chosen for various properties that will suit the subsequent use of the product. For instance, layers having properties such as resilience, impermeability, strength, shock absorption and softness are combined to be laminated into panels that will have selected characteristics.

The laminated panels are subsequently cut into desired shapes so as to define a component of the product. For instance, a laminated panel may be cut into boot quarters. In such cases, various other components are secured to the boot quarter to form the boot (shoes, boots, skates, etc.).

Strips of material are often secured (e.g., sewn) to the boot quarter so as to add ornamental and functional features to the boot quarter. For instance, strips of vinyl or the like are provided on a heel portion of the boot quarter to improve the structural integrity of the boot, and to give a specific look to the boot. Similarly, reinforcement strips are often provided in the shoelace eyelet section of the boot quarter, to enhance the tear resistance of this area.

The laminated panel often remains partially exposed, and is therefore constituted of materials having a desired appearance. For instance, nylon meshing and polymeric materials such as Surlyn™ are commonly used to make up the outer layer of laminated panels. In a combination, nylon meshing is laminated to produce embossing effects. In addition to adding some structural integrity to the boot quarter, the embossing effects have ornamental value, in that logos, and designs can be produced in the laminated panel, and therefore enhance the ornamental value of the boot.

On the other hand, materials with such appealing finishes are often relatively expensive. Considering that parts of the laminated panel making up the boot quarter are often concealed behind other strips of material (e.g., vinyl), having laminated panels with outer layers fully made of such expensive materials does not represent a cost-effective solution. However, as boot quarters represent the structure of boots, it is not possible to reduce the size of the boot quarter.

SUMMARY OF INVENTION

It is therefore an aim of the present invention to provide a laminated panel that addresses the issues associated with the prior art.

Therefore, in accordance with the present invention, there is provided a laminated panel comprising: a core layer having an upper surface; a first fusible layer portion having an upper surface with a first surface finish and a lower surface, the lower surface of the first fusible layer portion being secured to the upper surface of the core layer such that the first surface finish is exposed; and a second fusible layer portion having an upper surface with a second surface finish and a lower surface, the lower surface of the second fusible layer portion being secured to at least one of the upper surface of the core layer and the upper surface of the first fusible layer portion such that the second surface finish is exposed, the first fusible layer portion and the second fusible layer portion being positioned side-by-side and fused so as to be coplanar at a meeting line therebetween.

Further in accordance with the present invention, there is provided a method for laminating panels comprising: receiving at least a core layer, a first fusible layer portion and a second fusible layer portion; positioning the first fusible layer portion and the second fusible layer portion side-by-side on the core layer; and fusing the first fusible layer portion and the second fusible layer portion to the core layer, in such a way that the first fusible layer portion and the second fusible layer portion are coplanar at a meeting line between one another.

It is pointed out that, although the claims refer to the various layers and layer portions as having an upper surface and a lower surface, the upper and lower terminology is used to clarify the reference to either side of the layers and the layer portions. These expressions are not meant to indicate that the layers and layer portions are always used in a given orientation.

BRIEF DESCRIPTION OF THE DRAWINGS

Having thus generally described the nature of the invention, reference will now be made to the accompanying drawings, showing by way of illustration a preferred embodiment thereof and in which.

DESCRIPTION OF THE PREFERRED EMBODIMENTS

Figure 1:
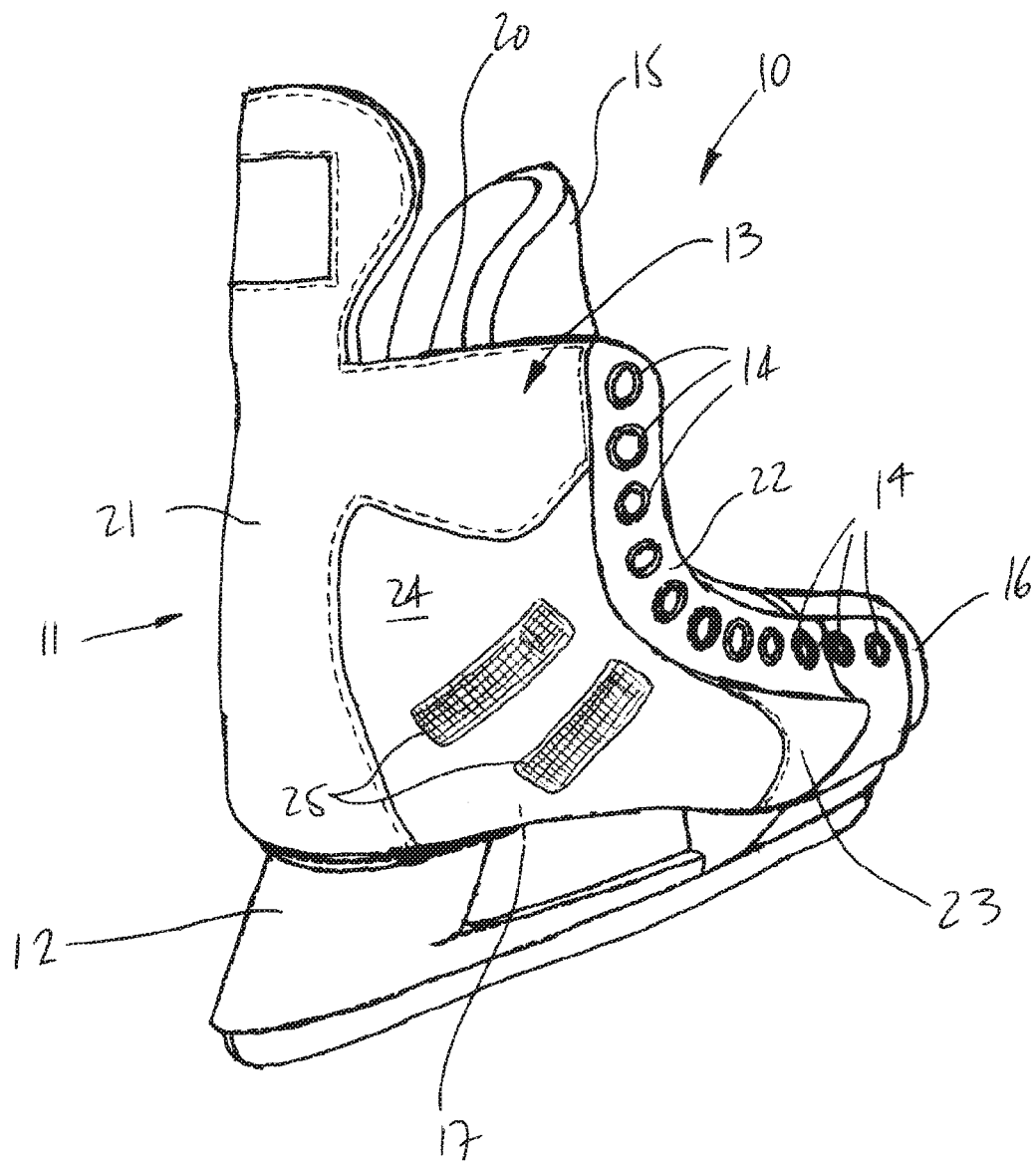
FIG. 1 is a perspective view of a skate having a boot quarter made of a laminated panel constructed in accordance with embodiments of the present invention.

Referring now to the drawings, and more particularly to FIG. 1, a skate, constructed with a laminated panel of the embodiments, is generally shown at 10. The skate 10 has a boot 11 for accommodating the foot of the wearer, and a blade portion 12 projecting downwardly from the boot 11. As is well known, the blade portion 12 is the interface between the skater and the ice during skating action.

The boot 11 has a boot quarter 13 making up a structure of the boot 11. The boot quarter 13 covers the sides of the foot as well as the heel portion and a part of the ankle. A plurality of eyelets 14 are provided to receive a lace. A tongue 15 is associated with the boot quarter 13 to cover a front portion of the wearer's foot/heel, while being displaceable to allow entry/withdrawal of the foot from the skate 10.

A nose 16 protrudes from a front portion of the skate 10 and covers the toes of the wearer. The nose 16 in the illustrated embodiment is associated with both the boot quarter 13 and the tongue 15. A sole portion 17 is at a bottom of the boot 11, and relates the boot quarter 13 to the blade portion 12.

The boot quarter 13 is made of a main laminated panel 20, upon which are secured (e.g., sewn) various strips of material. For instance, in the skate 10 of FIG. 1, a heel layer 21 covers a heel portion of the boot 11. The heel layer has a pair of wings 21A covering the ankle portion and merging with eyelet strips 22 (only one of which is visible in FIG. 1 because of the point of view). Lateral strips 23 (one of which is visible in FIG. 1) are adjacent to the nose 16 of the boot 11.

The heel layer 21, eyelet strip 22 and lateral strip are disposed such that the laminated panel 20 has an exposed portion 24, with optional embossing 25. It is observed however that a remainder of the laminated panel 20 of the boot quarter 13 is covered by the layer 21, and strips 22 and 23. In view of this, the construction of the laminated panel 20 is described.

Figure 2:
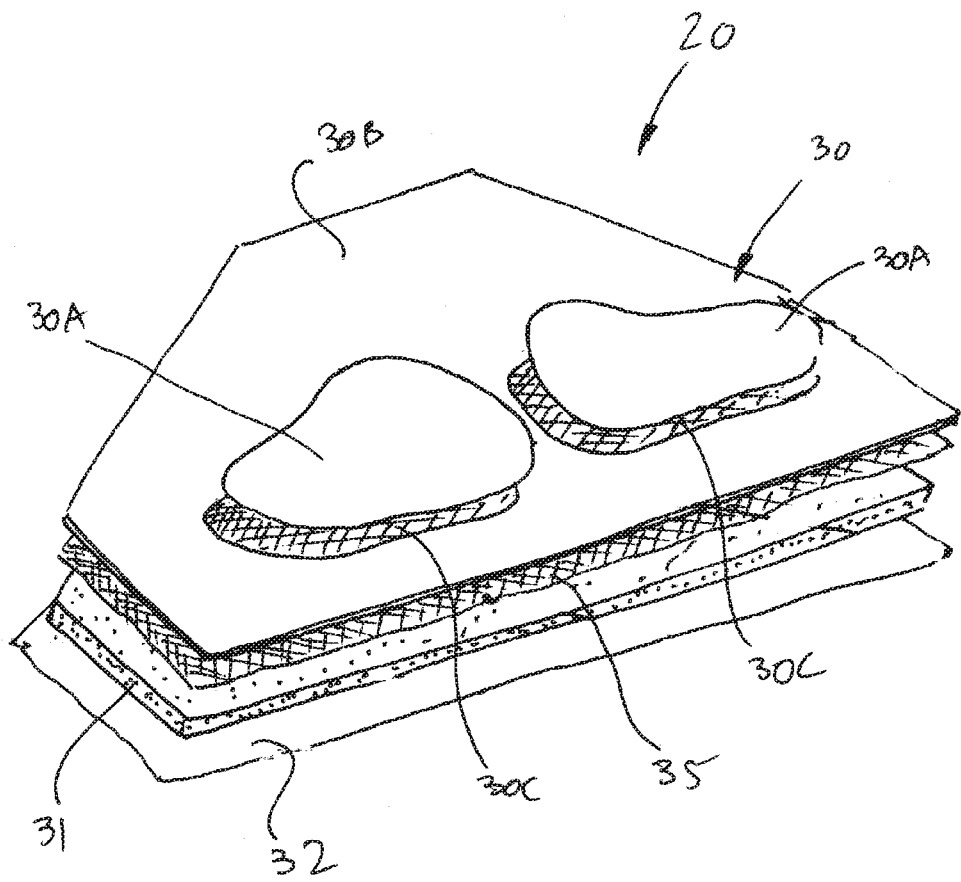
FIG. 2 is an exploded view of the laminated panel constructed in accordance with a first embodiment of the present invention.

Referring to FIG. 2, the laminated panel 20 is exploded to illustrate its various layers. The laminated panel 20 has an outer layer 30, a core 31 and an inner layer 32. Although the laminated panel 20 is illustrated as having three layers, fewer or more layers could be provided in the laminated panel 20.

The outer layer 30 is partly exposed (i.e., the exposed portion 24) and partly covered (i.e., by layer 21 and strips 22-23, as mentioned previously) in the shoe/boot. The outer layer 30 therefore consists of various materials providing a dual finish to the laminated panel 20, with a coplanar relationship between adjacent finishes at a meeting line therebetween.

More specifically, for the exposed portion 24 (FIG. 1), precut patterns 30A of material are provided and are positioned accordingly on the outer layer 30. For instance, the pair of patterns 30A are made of a thermofusible material, such as Surlyn ™ (a thermopoastic ionomer resin), a plastic, carbon fiber sheets and other composite materials, nylon, a felt, a mesh polyester or the like, that has a selected finish. As an example, the pair of patterns 30A may be a combination of a nylon mesh and Surlyn ™ interacting to create an embossing effect, as is the case for FIG. 2.

A backing layer portion 30B of the outer layer 30 is made of a thermofusible material of lesser price, as the material will be covered. Accordingly, a reinforcement material, such as a plastic, a felt or the like, are well suited to be used as backing layer portion 30B. It is pointed out that the backing layer portion 30B may be without cutouts opposite the patterns 30A, considering that both the patterns 30A and the layer portion 30B are thermofusible and will be fused to one another.

It is pointed out that the backing layer portion 30B may have a pair of superposed materials, with a mesh to encapsulate a thermofusible material to add structural integrity to the outer layer 30. Also, a thermofusible glue film 30C may be used to adhere the patterns 30A to the backing layer portion 30B.

The core 31 is chosen as a function of the use of the shoe/boot. For instance, padding is typically required, whereby an expanded polymer is well suited to be used as the material of the core 31. Expanded polymers considered for the core 31 are expanded polypropylene (i.e., EPP), expanded polyethylene (i.e., EPE), Arcel™, or the like.

An adhesive may be required between the outer layer ad the core 31. In such a case, a glue such as a thermofusible glue film 35 can be used between the outer layer 30 and the core 31.

The inner layer 32 is typically exposed in an interior of the boot, whereby the material used is typically a fabric or like soft material or fabric. For instance, a polyester fabric is typically used as the inner layer 32. Depending on the types of material used for the core 31 and the inner layer 32, an adhesive may be required to suitably secure the core 31 to the inner layer 32.

Figure 4:
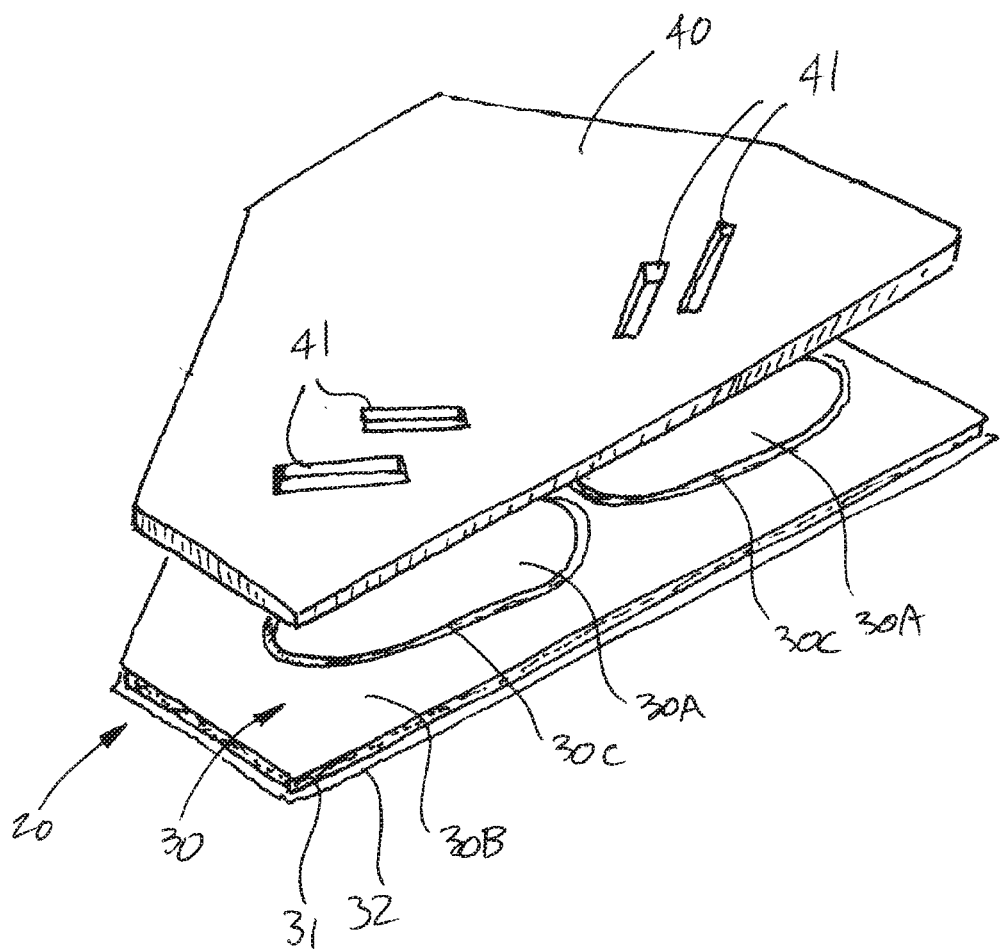
FIG. 4 is a perspective view of the laminated panel of FIG. 2, with respect to press plates prior to the lamination process.

Referring to FIG. 4, the laminated panel 20 is illustrated with press plates 40 prior to being laminated. As seen in FIG. 4 an upper press plate has cutouts 41, so as to produce embossing on the laminated panel 20. Additional process layers such as antiadhesive sheets may be used to protect the laminated panel 20 from sticking to the surfaces of a lamination press.

In order to be laminated, the components of the laminated panel 20 are superposed above one another as required, with applicable adhesives (e.g., thermofusible glue film). A lamination press then applies pressure (by compression) to the laminated panel 20 sandwiched between the press plates 40, and transfers heat simultaneously.

Figure 5:
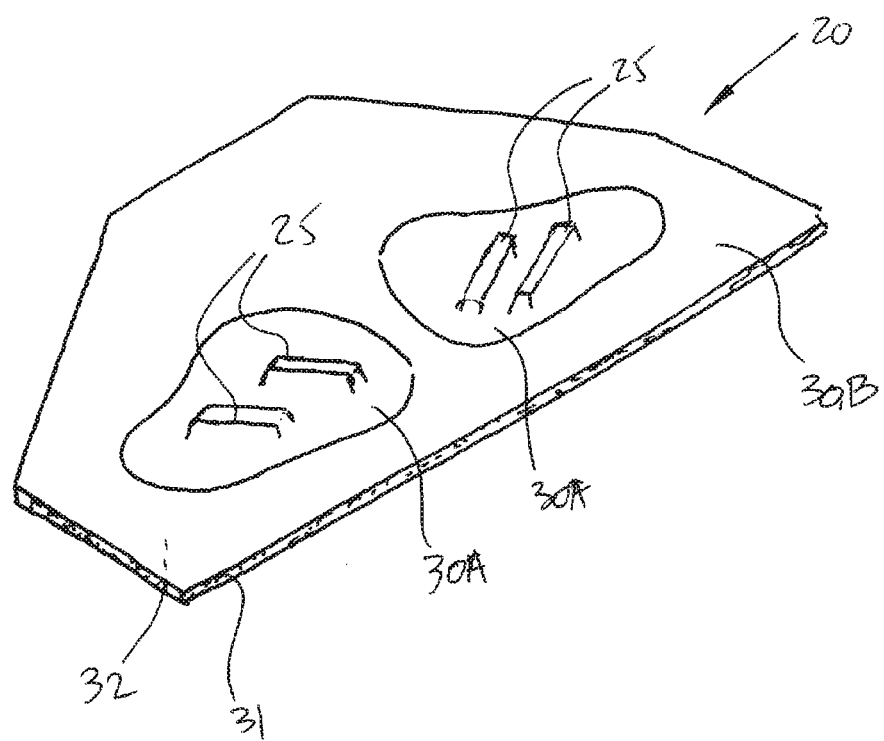
FIG. 5 is a perspective view of the laminated panel of FIG. 2, after the lamination process.

The combination of heat and pressure will result in the merging of the patterns 30A with the backing layer portion 30B to form a uniform surface, with embossing 25, as seen in FIG. 5. Suitable press settings will ensure that the laminated panel 10 exiting the press has a generally uniform thickness, other than at the embossing 25. More specifically, as the outer layer 30 has both the patterns 30A and the backing layer portion 30B made of thermofusible material, these components will both fuse under the action of heat from the press, and the pressure of the press will equalize the thickness of the laminated panel 20.

Simultaneously, the heat and pressure from the press will result in the interconnection of the outer layer 30, the core 31 and the inner layer 32, whether through the use of adhesive or through compatible reactions between the materials.

Therefore, as seen in FIG. 5, the patterns 30A and the backing layer portion 30B form the outer layer 30, but are flush with one another in a plane of the outer layer 30 due to the fusion reaction. The embossing 25 may be a mesh material (e.g., nylon mesh) protruding out of the surface of the outer layer 30 (as a function of the cutouts 41 in the press plates in FIG. 4), and encapsulated elsewhere in either the material of the patterns 30A or in the backing layer portion 30B.

Figure 6:
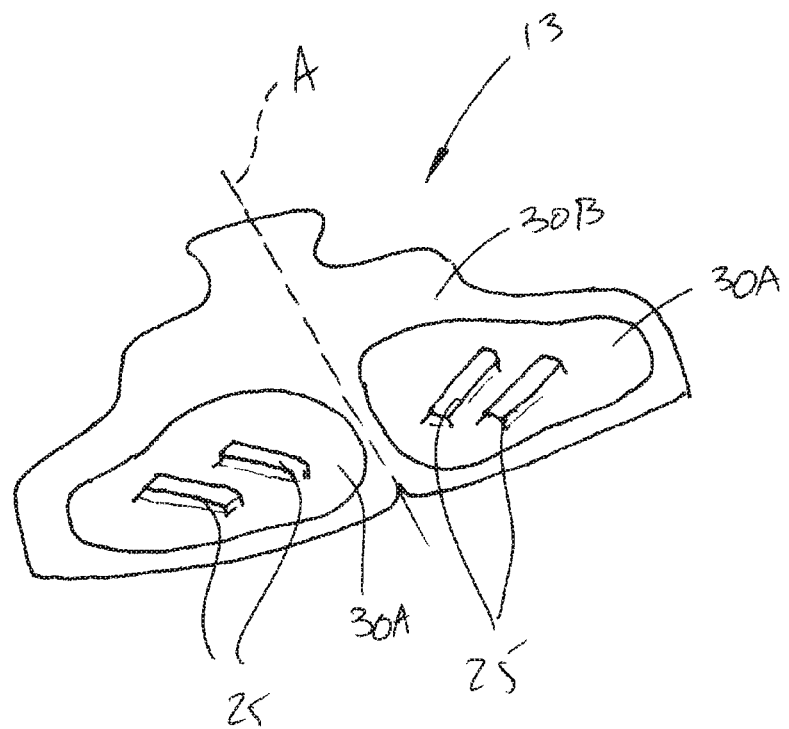
FIG. 6 is a perspective view of the laminated panel of FIG. 2, after being die-cut into a boot quarter.

Referring to FIG. 6, the laminated panel 20 is then cut to the selected shape of the boot quarter 13. In the illustrated embodiment, a symmetry line A represents a central axis positioned at the center of the heel portion of the skate 10. When the layer 21 and strips 22 and 23 are secured to the boot quarter 13, only the material of the patterns 30A and the embossing 25 will be visible (FIG. 1). This results in the dual finish of the laminated panel 20.

It is pointed out that although the boot quarter 13 is illustrated as being used for skates, other uses are contemplated, such as walking boots, ski boots and other footgear. Moreover, other type of equipment could be made with the laminated panel 20, such as sports gear of all kinds (e.g., goalie equipment for hockey), casings of different equipment and the like. For instance, the laminated panel 20 may be used as part of snowshoes. The laminated panel 20 may form the decking, with the patterns 30A being the central exposed part of the decking. The backing layer portion 30B is hidden behind a peripheral eyelet strip by which the decking of laminated panel 20 is secured to the frame of the snowshoe.

Figure 3A:
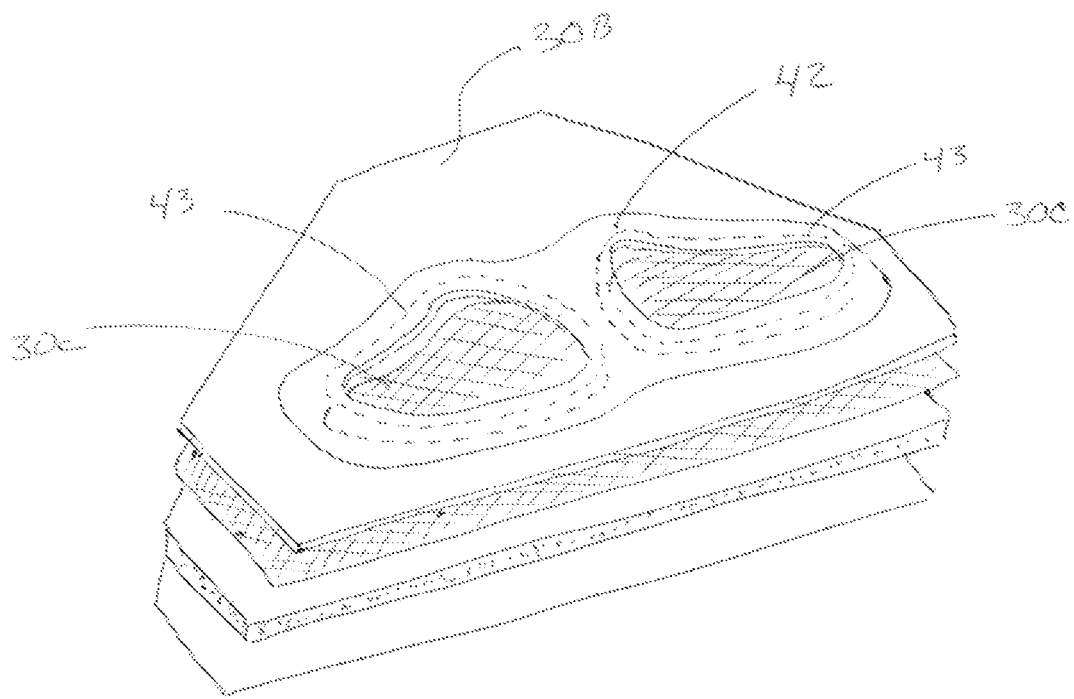
FIG. 3A is an exploded view of the laminated panel constructed in accordance with a second embodiment of the present invention.
Figure 3B:
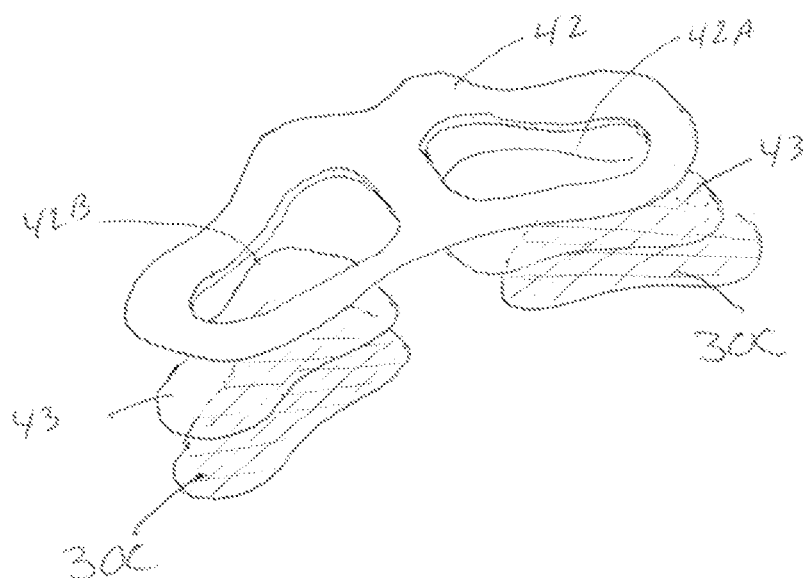
FIG. 3B is an exploded view of the laminated panel constructed with additional films in accordance with the second embodiment.

Referring to FIGS. 3A and 3B, there is illustrated a second embodiment of the laminated panel 20. The laminated panel 20 of FIGS. 3A and 3B is of similar construction as the laminated panel 20 of FIG. 2, whereby like elements will bear like reference numerals. The laminated panel 20 of FIGS. 3A and 3B has additional components in a periphery cover layer portion 42, with cutouts 42A and 42B, and see-through protective layer portion 43 (shown as a pair of pieces).

The see-through protective layer portion 43 is made of a transparent or translucent material, allowing the visual exposure of the material of the patterns 30A. Therefore, the layer 43 is sized to cover the patterns 30A. According to an embodiment, the material used for the protective layer portion 43 is a fusible polymeric material, such as Surlyn™, that is compatible with the backing layer portion 30B, for the periphery of the layer portion 43 to fuse with the backing layer portion 30B, and therefore conceal the material of the patterns 30A thereunder. Any suitable thickness of the fusible polymeric material may be used for the protective layer portion 43 (e.g., 0.010").

The periphery cover layer portion 42 is used to protect the edges of the patterns 30A, considering the woven nature of the material of patterns 30A in some embodiments. Therefore, the periphery cover layer portion 42 has the cutouts 42A and 42B sized such that the layer portion 42 covers the periphery of the patterns 30A. Therefore, the cutouts 42A and 42B have any appropriate ornamental shape to create the desired visual effect.

The periphery cover layer portion 42 is therefore made of an opaque material that is compatible with the protective layer portion 43 and with the backing layer portion 30B for fusing to one another and therefore protect the material of the patterns 30A. For instance, a fusible polymeric material, such as Surlyn™, may be used for the periphery cover layer portion 42. For this reason, the outer periphery of the layer portion 42 is substantially smaller than that of the backing layer portion 30B, as the backing layer portion 30B need not have a presentable finish as it will be behind components of the boot or other accessory made from the laminated panel 20.

As a result, the edges of the patterns 30A are covered by the periphery cover layer portion 42, while the main surface of the patterns 30A are covered by the see-through protective layer portion 43. This reduces the delamination or garneting of the material of the patterns 30A. Moreover, these layer portions may reduce water penetration in the laminated panel 20 via the material of the patterns 30A.

The invention claimed is:

1. A laminated panel comprising:
a core layer having an upper surface and a lower surface;
a first fusible layer portion having an upper surface with a first surface finish and a lower surface, the lower surface of the first fusible layer portion being secured to the upper surface of the core layer such that the first surface finish is exposed; and
a second fusible layer portion having an upper surface with a second surface finish and a lower surface, the lower surface of the second fusible layer portion being secured to at least one of the upper surface of the core layer and the upper surface of the first fusible layer portion such that the second surface finish is exposed, the upper surface of the first fusible layer portion and upper surface of the second fusible layer portion being positioned side-by-side and fused to form a meeting line visible at the exposed upper surface of the laminated panel, the upper surface of the first fusible layer portion and the upper surface of the second fusible layer portion being coplanar at said meeting line therebetween, the laminated panel having a generally uniform thickness between the lower surface of the core layer and the exposed upper surface of the laminated panel, the exposed upper surface of the laminated panel being formed jointly by the upper surface of the first fusible layer portion and the upper surface of the second fusible layer portion as positioned side-by-side and coplanar, wherein the first fusible layer portion and the second fusible layer portion are made from different materials.

2. The laminated panel according to claim 1, further comprising a see-through protective film secured to the upper surface of the second fusible layer portion, through which the second surface finish is visible.

3. The laminated panel according to claim 2, further comprising a periphery cover film secured over the meeting line between the first fusible layer portion and the second fusible layer portion, the periphery cover film having at least one cutout sized such the second surface finish is visible via the cutout and through the see-through protective film while the meeting line and a portion of the first surface finish are concealed by the periphery cover film.

4. The laminated panel according to claim 1, further comprising a periphery cover film secured over the meeting line between the first fusible layer portion and the second fusible layer portion, the periphery cover film having at least one cutout sized such the second surface finish is visible via the cutout while the meeting line and a portion of the first surface finish are concealed by the periphery cover film.

5. The laminated panel according to claim 1, wherein the core layer is at least one of a polymeric foam and of an expanded polymer.

6. The laminated panel according to claim 1, further comprising an inner layer secured to a lower surface of the core layer, the inner layer being made of a fabric.

7. The laminated panel according to claim 6, comprising an adhesive layer between any of the inner layer, the core layer, the first fusible layer portion and the second fusible layer portion.

8. The laminated panel according to claim 1, wherein the second fusible layer portion further comprises a mesh portion, the second surface finish of the second fusible layer portion comprising an embossed pattern of the mesh projecting up from a remainder of the second fusible layer portion, a thickness of the laminated panel being greater than said generally uniform thickness at said mesh portion.

9. The laminated panel according to claim 1, wherein the first fusible layer portion is made of any one of a plastic and a felt.

10. The laminated panel according to claim 1, wherein the second fusible layer portion is made of any one of thermoplastic ionomer resin, a plastic, carbon fiber, composite materials, nylon, a felt, and a mesh polyester.

11. The laminated panel according to claim 1, wherein a periphery of the laminated panel defines a quarter of a boot.

12. The laminated panel according to claim 11, further comprise at least one of eyelet strips, and a heel portion secured to the upper surface of the first fusible layer portion to conceal the first surface finish.

* * * * *